Patented Dec. 15, 1953

2,662,871

UNITED STATES PATENT OFFICE 2,662,871

POLYESTERS MADE FROM DIBASIC ACIDS DERIVED FROM VANILLIN

Louis H. Bock, Shelton, Wash., assignor to Rayonier Incorporated, Shelton, Wash., a corporation of Delaware No Drawing. Application November 28, 1950, Serial No. 198,048

2 Claims. (Cl. 260—47)

This invention relates to synthetic linear condensation polymers suitable for the formation of filaments, films, and molded objects, and has for its object the provision of improved synthetic linear condensation polymers and a method of making the polymers.

A further object is the preparation of fiber-forming linear polymeric materials with a high degree of chemical stability, low solubility in water and in organic solvents, and the ability to absorb coloring materials, i. e., to be readily dyed.

The polymers of the present invention are linear polyesters prepared from dibasic acids of the following type:

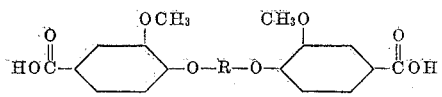

in which R is a divalent aliphatic group represented by the following examples:

—CH$_2$CH$_2$—
—CH$_2$CH$_2$—CH$_2$—
—(CH$_2$)$_n$— where $n$ is 2 to 6
—CH$_2$CH$_2$OCH$_2$CH$_2$—

These acids are advantageously prepared from vanillin or vanillic acid as described and claimed in my copending application Serial No. 198,047, filed November 28, 1950.

In the preparation of the polyesters of this invention in accordance with my method, the above dibasic acids are esterified with dihydric alcohols and condensed by heating to form linear polymers of high molecular weight. For example, in using ethylene glycol as the dihydric alcohol, the reaction is as follows:

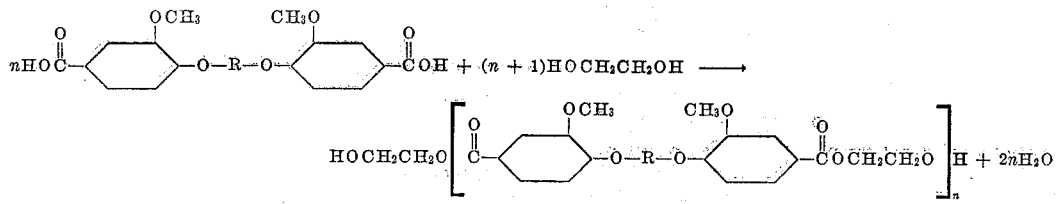

In one advantageous method of the invention, I prepare first the bis-glycol ester of the dibasic acid and then condense this to the polymer by heating under vacuum. The condensation proceeds at a temperature of 200–300° C. The optimum temperature is in the range 270–285° C. as at higher temperatures thermal decomposition occurs. Heating must be done in the absence of oxygen to prevent oxidation which results in a dark colored product, cleavage products of low molecular weight and in cross-linking of the polymer to give a gelled product that cannot be extruded and drawn into filaments.

The polyesters of the invention are clear, hard, glass-like solids of high molecular weight. They may be extruded into air at temperatures above their melting points to form filaments which can be cold-drawn to give filaments of high tensile strength suitable for textile use. The preparation of these polymers is illustrated by the following examples:

Example 1

A mixture of 87 parts of ethane-1,2-bis-(2-methoxy-4-carboxyphenyl) ether and 201 parts of ethylene glycol was placed in a vessel equipped with an air condenser for reflux. The mixture was refluxed 48 hours during which time water vapor escaped through the condenser. The reaction mixture was then cooled and poured in a thin stream into 1700 parts of water with vigorous agitation. The hydroxyethyl ester separated as a fine white precipitate which was filtered, washed with water and crystallized from a 25% solution of ethylene glycol in water. The product which is the bis-2-hydroxyethyl ester of ethane-1,2-bis(2-methoxy - 4 - carboxyphenyl) ether consists of fine white needles melting at 159–162° C. The yield was 76 parts or 70% of the theoretical amount. The saponification equivalent found was 223 compared with a theoretical value of 225 for a dibasic ester of the formula C$_{22}$H$_{26}$O$_{10}$.

Example 2

Pure bis-2-hydroxyethyl ester of ethane-1,2-(bis-2-methoxy-4-carboxyphenyl) ether, as described in Example 1, was placed in a vacuum-tight glass vessel equipped with thermocouple well. The vessel was evacuated to a pressure of 0.02 to 0.10 mm. of mercury and heated gradually to a temperature of 275° C. over a period of 3 hours. It was then maintained at 275–280° C. for 21 hours, the vacuum being maintained all this time by means of a vacuum pump. The mixture was then allowed to cool and air was admitted to the vessel. The product was a hard, colorless, glass-like solid. It melted at 190° C. It was insoluble in water and the usual organic solvents but could be dissolved in slight amounts in m-cresol and in o-chlorophenol. Intrinsic viscosity as determined in m-cresol was 0.61.

*Example 3*

A mixture of 25 parts of propane-1,3-bis-(2-methoxy-4-carboxyphenyl) ether, 65 parts of ethylene glycol and 14 parts of n-butanol was placed in a vessel equipped with a distilling column packed with glass helices and fitted with a total reflux distilling head. The mixture was refluxed and water was removed from the head of the column. The reaction mixture was cooled and poured in 600 parts of water with vigorous agitation. A white solid separated which was filtered, washed with water and dried. The yield was 25.9 parts or 85.2% of theory. The product was purified by crystallizing from a mixture of 600 parts of toluene and 100 parts of methanol. The product melted at 141–155° C. It was the bis-2-hydroxyethyl ester of propane-1,3-bis(2-methoxy-4-carboxyphenyl) ether.

*Example 4*

Pure bis-2-hydroxyethyl ester of propane-1,3-bis-(2-methoxy-4-carboxyphenyl) ether prepared as described in Example 3 was placed in a vacuum-tight glass vessel equipped with a thermocouple well. The vessel was evacuated to a pressure of 0.03 to 0.04 mm. of mercury and heated 18 hours at 260–282° C. The product solidified to a hard, glassy solid on cooling. It had strong adhesion to glass and was removed from the reaction vessel by breaking the glass. The product was extremely tough.

*Example 5*

A mixture of 203 parts of tetramethylene-1,4-bis-(2-methoxy-4-carboxyphenyl) ether and 496 parts of ethylene glycol was refluxed 23 hours at a temperature of 193–204° C. The reaction mixture was cooled and poured into 2000 parts of water. A gummy product separated which gradually solidified. The crude yield was 250 parts or 100% of theory. It was purified by crystallizing from a mixture of 4000 parts of methanol and 1000 parts of toluene. The product melted at 95–115° C. It was the bis-2-hydroxyethyl ester of tetramethylene-1,4-bis-(2-methoxy-4-carboxyphenyl) ether.

*Example 6*

Pure 2-hydroxyethyl ester of tetramethylene-1,4-bis-(2-methoxy-4-carboxyphenyl) ether was condensed under the conditions described in Example 4. The polymer was a pale amber solid melting at 93–117° C. It had an intrinsic viscosity in o-chlorophenol of 0.36.

*Example 7*

A mixture of 196 parts of bis-(2-methoxy-4-carboxyphenoxyethyl) ether and 500 parts of ethylene glycol was reacted under the conditions described in Example 5 to give the bis-2-hydroxyethyl ester. The product melted at 112–115° C. and had a saponification equivalent of 254 compared with a theoretical value of 247 for a diester of formula $C_{24}H_{30}O_{11}$.

*Example 8*

Pure 2-hydroxyethyl ester of bis-(2-methoxy-4-carboxyphenoxyethyl) ether was condensed by heating 7 hours at 250–275° C. and a pressure of 0.20 mm. of mercury. The product melted at 95–118° C. and had an intrinsic viscosity in o-cresol of 0.28.

The polymers of this invention are all capable of being extruded at temperatures above their melting points and formed into fibers. The product of Example 2 was extruded through an orifice of 0.5 mm. diameter at 230° C. by applying 8 pounds nitrogen pressure. The filament that formed was wound on a drum at the rate of 67 meters per minute. The filament so obtained had a denier of 4.5 and a tenacity of 1.55 g. per denier.

The filaments can be cold drawn to greatly increase the tenacity. The polymer of Example 2 was extruded through an orifice 0.5 mm. in diameter at 205° C. by applying 40 pounds of nitrogen pressure. The filament was passed 1¼ turns over a drum at the rate of 23 meters per minute, was passed over ruby guides through a water bath at 80° C. and was then wound on a drum at the rate of 61.5 meters per minute, thus undergoing a stretch of 168%. The resulting filament had a denier of 1.9 and a tenacity of 4.2 g. per denier. The resulting filament had a birefringence of 0.12 which indicates a high degree of molecular orientation.

The presence of the methoxyl group in the benzene ring does not interfere with the crystalline orientation of the polymer upon drawing as might be expected from published reports on the effect of lateral groups on linear polymers. The methoxyl groups have a beneficial effect in that they make the polymer more receptive to dyes. Thus the above-described filaments can be dyed by the use of the usual cellulose acetate dyes in an aqueous bath at 70° C.

While I prefer to use ethylene glycol as the dihydric alcohol, I may also use trimethylene glycol, tetramethylene glycol, or diethylene glycol.

I claim:

1. Linear polyesters obtained by the condensation of a dihydric alcohol with the dibasic acids:

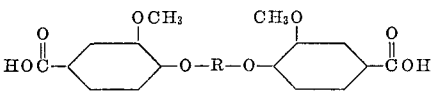

in which R is a divalent aliphatic member of the group consisting of $-(CH_2)_n-$ where $n$ is 2 to 6, and $-CH_2CH_2OCH_2CH_2-$.

2. Linear polyesters obtained by the condensation of ethylene glycol with the dibasic acids:

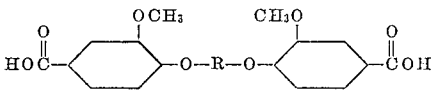

in which R is a divalent aliphatic member of the group consisting of $-(CH_2)_n-$ where $n$ is 2 to 6, and $-CH_2CH_2OCH_2CH_2-$.

LOUIS H. BOCK.

References Cited in the file of this patent

UNITED STATES PATENTS

| Number | Name | Date |
|---|---|---|
| 2,465,150 | Dickson | Mar. 22, 1949 |

OTHER REFERENCES

Beilstein: Vol. 10, page 395 (1927).

Hill et al., J. Polymer Science 3, pp. 609–630 October 1948.